US011629622B2

(12) United States Patent
Uhlenbrock

(10) Patent No.: US 11,629,622 B2
(45) Date of Patent: Apr. 18, 2023

(54) METHOD FOR OPERATING AN EXHAUST GAS BURNER

(71) Applicant: Robert Bosch GmbH, Stuttgart (DE)

(72) Inventor: Dietmar Uhlenbrock, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/706,884

(22) Filed: Mar. 29, 2022

(65) Prior Publication Data

US 2022/0307401 A1 Sep. 29, 2022

(30) Foreign Application Priority Data

Mar. 29, 2021 (DE) .......................... 102021203083.1

(51) Int. Cl.
*F01N 3/20* (2006.01)
*B01D 53/94* (2006.01)
*F01N 3/32* (2006.01)

(52) U.S. Cl.
CPC ....... *F01N 3/2033* (2013.01); *B01D 53/9454* (2013.01); *F01N 3/204* (2013.01); *F01N 3/32* (2013.01); *F01N 2900/10* (2013.01); *F01N 2900/1406* (2013.01)

(58) Field of Classification Search
CPC .... F01N 3/0253; F01N 2240/14; F01N 3/027; F01N 3/025
See application file for complete search history.

(56) References Cited

U.S. PATENT DOCUMENTS

| 4,459,804 A * | 7/1984 | Nakajima | F02P 15/02 |
| | | | 123/638 |
| 2011/0279008 A1* | 11/2011 | Korenev | H01T 13/20 |
| | | | 313/141 |
| 2016/0348898 A1* | 12/2016 | Tsumagari | F23D 11/40 |

FOREIGN PATENT DOCUMENTS

| CN | 103097683 A * | 5/2013 | ............ F01N 3/025 |
| DE | 2219371 A1 | 2/1973 | |
| DE | 3136792 A1 | 3/1983 | |
| DE | 3545437 A1 | 7/1987 | |
| DE | 4132814 A1 | 4/1993 | |
| DE | 4225274 A1 | 2/1994 | |
| DE | 19504208 A1 | 8/1995 | |
| DE | 19524261 A1 | 1/1997 | |

\* cited by examiner

*Primary Examiner* — Anthony Ayala Delgado
(74) *Attorney, Agent, or Firm* — Michael Best & Friedrich LLP

(57) ABSTRACT

A method for operating an exhaust gas burner (3) downstream of an internal combustion engine (1) and upstream of an exhaust gas catalytic converter (4), comprising controlling an ignition device (12) of the exhaust gas burner (3) during a predeterminable preheating phase without supplying fuel (11) to the exhaust gas burner (3) during the preheating phase and, after completion of the preheating phase, supplying fuel (11) to the exhaust gas burner (3) and burning the supplied fuel (11) in the exhaust gas burner (3). A processor unit and a computer program product for carrying out such a method are furthermore proposed.

10 Claims, 3 Drawing Sheets

METHOD FOR OPERATING AN EXHAUST GAS BURNER

BACKGROUND OF THE INVENTION

The present invention relates to a method for operating an exhaust gas burner, and to a processor unit and a computer program for carrying it out.

To meet legally prescribed emissions limits, it is possible to use three-way catalytic converters (TWCs), which enable the relevant gaseous pollutants $NO_x$, HC and CO to be converted into harmless products such as $N_2$, $H_2O$ and $CO_2$. In order for these catalytic reactions to proceed as intended, the temperatures in the catalytic converter must generally exceed what is referred to as the light-off temperature, typically 300-400° C. As soon as this has been reached or exceeded, the catalytic converter almost completely converts the relevant pollutants ("catalyst window").

In order to achieve this state as quickly as possible, catalyst heating measures can be employed within the engine. In this case, the efficiency of the spark-ignition engine is lowered by retarded ignition angles, and in this way the exhaust gas temperature and the enthalpy input to the catalytic converter are increased. At the same time, combustion stability can be ensured by means of adapted injection strategies (e.g., multiple injections).

In addition to these catalyst heating measures within the engine, it is also possible to employ external catalyst heating measures, for example by means of electrically heatable catalytic converters or exhaust gas burners. Such external heating measures are described in DE 41 32 814 A1 and DE 195 04 208 A1, for example.

In order to further reduce emissions in comparison with conventional operation using heating measures within the engine, particularly in the case of cold starts, that is to say high loads on the internal combustion engine in the cold state without an idling phase, so-called catalytic burners of the kind described, for example, in the abovementioned DE 41 32 814 A1 or in DE 22 19 371 A1, for accelerating TWC light-off have proven to be an extremely effective measure.

SUMMARY OF THE INVENTION

According to the invention, a method for operating an exhaust gas burner and a processor unit and a computer program for carrying it out are proposed.

The invention is based on the insight that an exhaust gas burner starts more quickly and more cleanly when the combustion chamber of the burner has already been preheated. Therefore, within the scope of the invention, the ignition device, for example a spark plug, is operated even before the actual start of operation of the exhaust gas burner (that is to say, in particular, without metering in fuel) in order to preheat the combustion chamber.

To generate an ignition spark (in the case of conventional coil ignition), an ignition coil or its primary winding can be charged up to a predetermined current or current value. In this case, the current rises during the charging time, starting from zero. At a desired ignition time, the current flow through the primary winding is then interrupted, as a result of which an oscillation is excited in a secondary winding, causing the secondary voltage (that is to say the voltage in the secondary winding) to run up until there is a breakdown at the ignition device (for example a spark plug). The energy of the ignition coil is then discharged on the secondary side in that the spark current (that is to say the current flow via the spark gap) is continued over a certain spark duration or time period, which depends on the primary current (that is to say on the current to which the primary winding has been charged). In the process, the spark current decreases continuously until the spark goes out.

More specifically, a method according to the invention for operating an exhaust gas burner downstream of an internal combustion engine and upstream of an exhaust gas catalytic converter comprises controlling or igniting an ignition device of the exhaust gas burner during a predeterminable preheating phase without supplying fuel to the exhaust gas burner during the preheating phase and, after completion of the preheating phase, supplying fuel to the exhaust gas burner and burning the supplied fuel in the exhaust gas burner. The operation of the ignition device results in preheating of the combustion chamber of the exhaust gas burner, with the result that the fuel evaporates more rapidly in the vicinity of the ignition device and forms an ignitable mixture with the air supplied. Overall, a faster burner start than in conventional applications is thus possible.

The method advantageously comprises determination of a start and/or a duration of the preheating phase as a function of input signals, which, in particular, comprise one or more of the group comprising a temperature, a locking state of a vehicle door, a seat occupancy state, a belt buckle state and a start request. It is thereby possible to plan the preheating phase in a selective manner if a start of the internal combustion engine becomes probable, something that can be determined by using the input signals mentioned, or the preheating phase can be adapted to an estimated heating requirement (for example as a function of an outside temperature). It is thereby possible to achieve precise control with minimum energy losses and with maximum effect.

The duration of the preheating phase is advantageously selected from a range between 0.2 s and 10 s, preferably between 0.5 s and 5 s. The longer the spark duration of the ignition device, the more heat is introduced into the combustion chamber. In the case of a spark plug, the spark duration can be varied with the choice of a suitable ignition coil; repeated ignition can, of course, also be used to prolong the preheating phase.

The ignition device advantageously generates a spark with a length in a range between 0.5 mm and 2.5 mm, preferably between 0.7 and 2 mm, in particular between 0.9 mm and 1.6 mm. It should be noted here that the shorter the spark, the more stable it is, but with increasing length it causes more heat to be introduced into the combustion chamber. In respect of the spark length, an optimum is therefore set between reliable ignition of the air/fuel mixture after the preheating phase and the highest possible heating power during the preheating phase.

A power of the exhaust gas burner is advantageously increased to a rated power of the exhaust gas burner within less than 5 s, 3 s, 2 s, 1 s or 0.5 s after the start of the supply of fuel. This enables rapid heating of the components arranged downstream of the burner, in particular of an exhaust gas catalytic converter.

For an internal combustion engine of a passenger car, the rated load of the exhaust gas burner can typically be between 5 kW and 30 kW, for example between 12 kW and 25 kW.

In particular, the rated power of the exhaust gas burner is available at the latest 2 s after starting of the internal combustion engine. For this purpose, provision can also be made in some embodiments of the invention for the exhaust gas burner to be operated with fuel even before the internal combustion engine is started, in particular even before a start request is received from a driver or operator.

The method furthermore advantageously comprises controlling the power of the exhaust gas burner as a function of a pressure downstream of the internal combustion engine. It is thereby possible, in the case of high load requirements after starting of the internal combustion engine, to optimize the efficiency of the internal combustion engine in order to avoid a power drop due to an excessively high exhaust gas quantity of the exhaust gas burner.

A secondary air pump for supplying the exhaust gas burner can optionally already be activated during the preheating phase. This results in a further time advantage in comparison with conventional methods since the secondary air pump has already been accelerated to operating speed at the end of the preheating phase.

A processor unit according to the invention, e.g., a control unit of a motor vehicle, is designed, in particular in terms of program technology, to carry out a method according to the invention.

The implementation of a method according to the invention in the form of a computer program or computer program product with program code for carrying out all method steps is also advantageous since this gives rise to particularly low costs, especially if an executing control unit is also used for other tasks and is therefore present anyway. Suitable data carriers for providing the computer program are, in particular, magnetic, optical and electrical memories, such as hard disks, flash memories, EEPROMs, DVDs and the like. It is also possible to download a program via computer networks (Internet, intranet, etc.).

Further advantages and embodiments of the invention will become apparent from the description and the accompanying drawing.

The invention is illustrated schematically in the drawing by means of exemplary embodiments and is described below with reference to the drawing.

DETAILED DESCRIPTION

Figure 1:
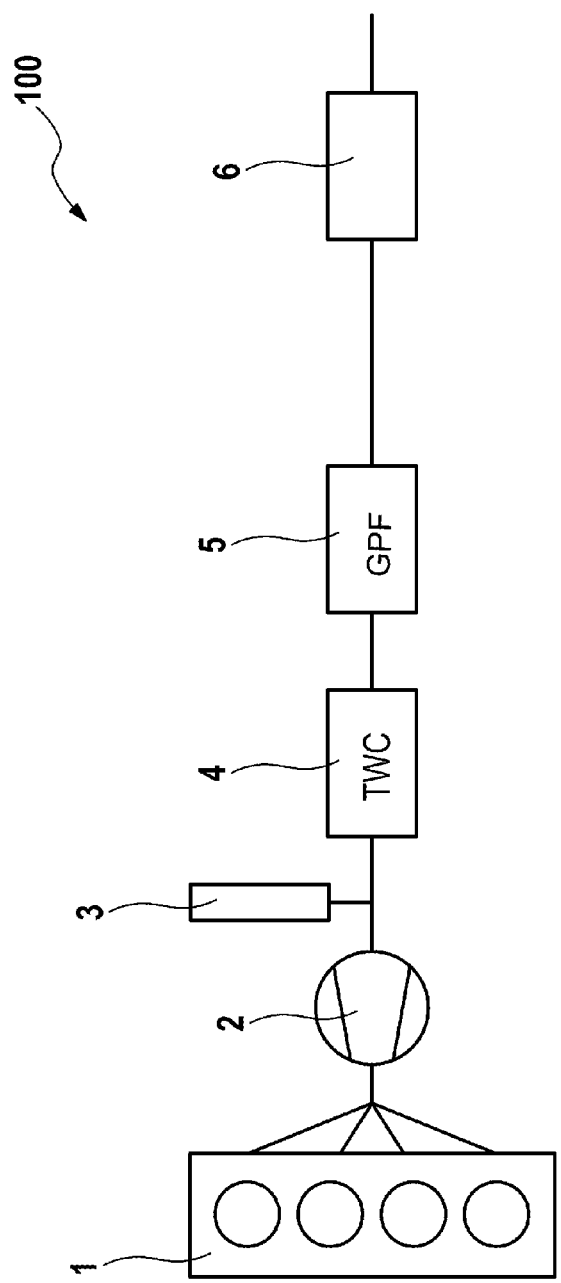
FIG. 1 shows schematically an arrangement with an internal combustion engine, an exhaust gas burner and an exhaust gas catalytic converter, of the kind that can be used in advantageous embodiments of the invention.

FIG. 1 shows schematically an arrangement with an internal combustion engine, an exhaust gas burner and an exhaust gas catalytic converter, of the kind that can be used in advantageous embodiments of the invention and which is denoted overall by 100.

In the example illustrated, an internal combustion engine 1 with four cylinders, a turbocharger 2 (optional), an exhaust gas burner 3, a three-way catalytic converter 4 (TWC) and a gasoline particulate filter 5 (GPF) and a muffler 6 are provided, it also being possible for further components, which are not shown here, to be provided within the scope of the invention. For example, it is also possible to provide a plurality of catalytic converters, and the arrangement of the individual components with respect to one another need not necessarily correspond to the illustrated sequence, unless stated otherwise. The decisive factor is that the internal combustion engine 1 is arranged upstream of the other components and that the exhaust gas burner 3 is installed upstream of the catalytic converter 4 in as close proximity as possible to said catalytic converter. In the case of a plurality of catalytic converters, the exhaust gas burner 3 is to be provided in the vicinity of the respective catalytic converter to be heated in order to achieve the most efficient heat supply possible.

As already mentioned at the outset, the catalytic converter 4 is designed for the conversion of pollutants which may be contained in an exhaust gas of the internal combustion engine 1 (but also of the exhaust gas burner 3). However, the catalytic converter 4 can only fulfill this task above a certain minimum temperature (referred to as the light-off temperature). As already explained, the exhaust gas burner 3 should therefore heat the catalytic converter 4 as quickly as possible to a temperature above the light-off temperature and, in the process, emit as small a proportion of pollutants as possible in its own exhaust gas.

Figure 2:
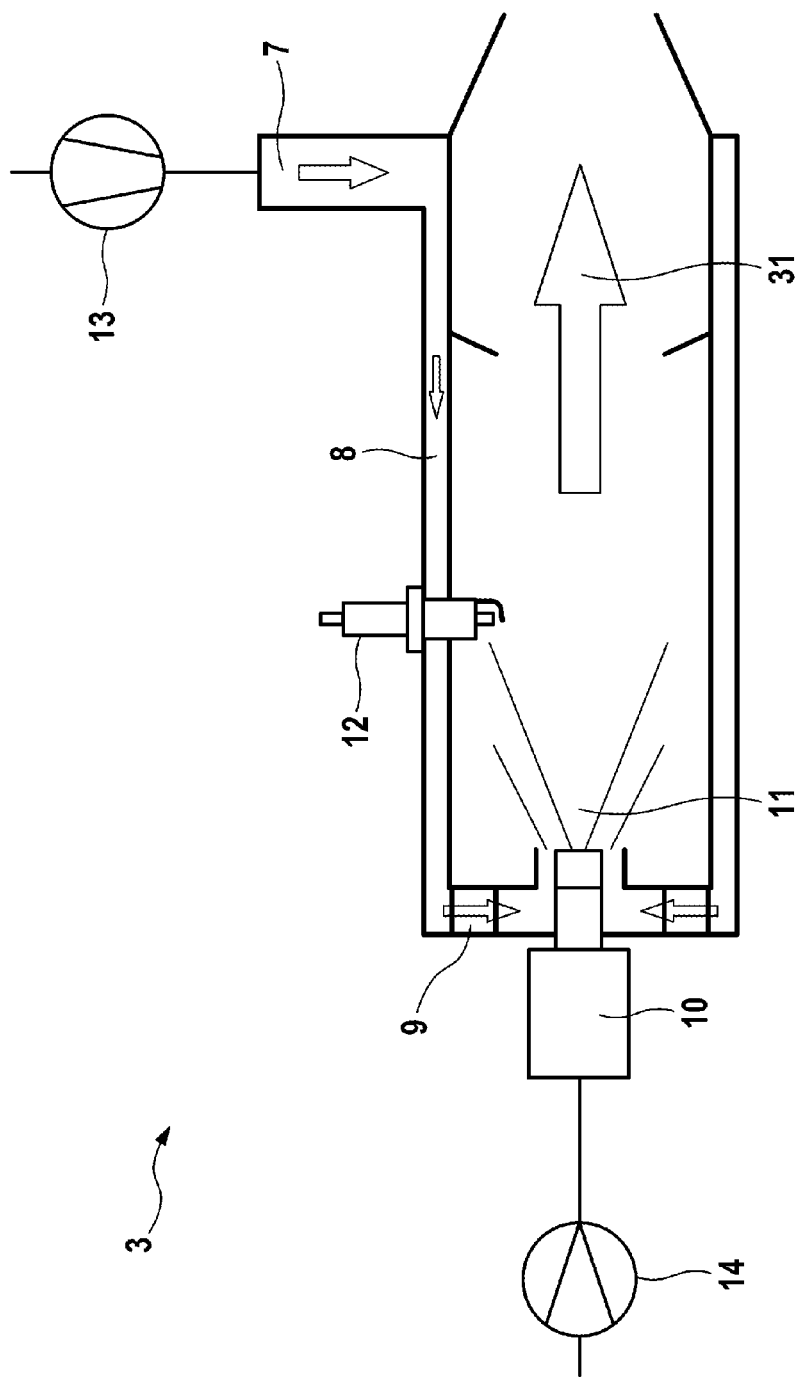
FIG. 2 shows a schematic illustration of an exhaust gas burner of the kind that can be used in embodiments of the present invention.

An exhaust gas burner 3 of this kind is illustrated schematically in more detail in FIG. 2.

In the example shown, during a normal operating period of the exhaust gas burner 3, air 7 is delivered by means of a secondary air pump 13 (SAP) into a burner jacket 8, swirled by means of a swirl grating 9 and guided to an injection valve 10. Via the injection valve, fuel 11 is fed to the air 7 by means of a fuel pump (EFP) 14. By means of the swirl and the injection angles, a combustible fuel/air mixture is produced and guided to a spark plug 12. Here, the mixture is ignited and burns in the combustion chamber. Hot combustion gases or burner exhaust gas 31 produced during this process are introduced into the exhaust system downstream of the internal combustion engine 1 and upstream of the catalytic converter 4 to be heated.

Within the scope of the present invention, before the normal operating period just described, the spark plug 12 of the exhaust gas burner 3 is operated without fuel supply during a preheating period in order to heat the combustion chamber of the exhaust gas burner 3 at least in the direct vicinity of the spark plug 12, facilitating or promoting ignition during an initial phase of the normal operating period.

Figure 3:
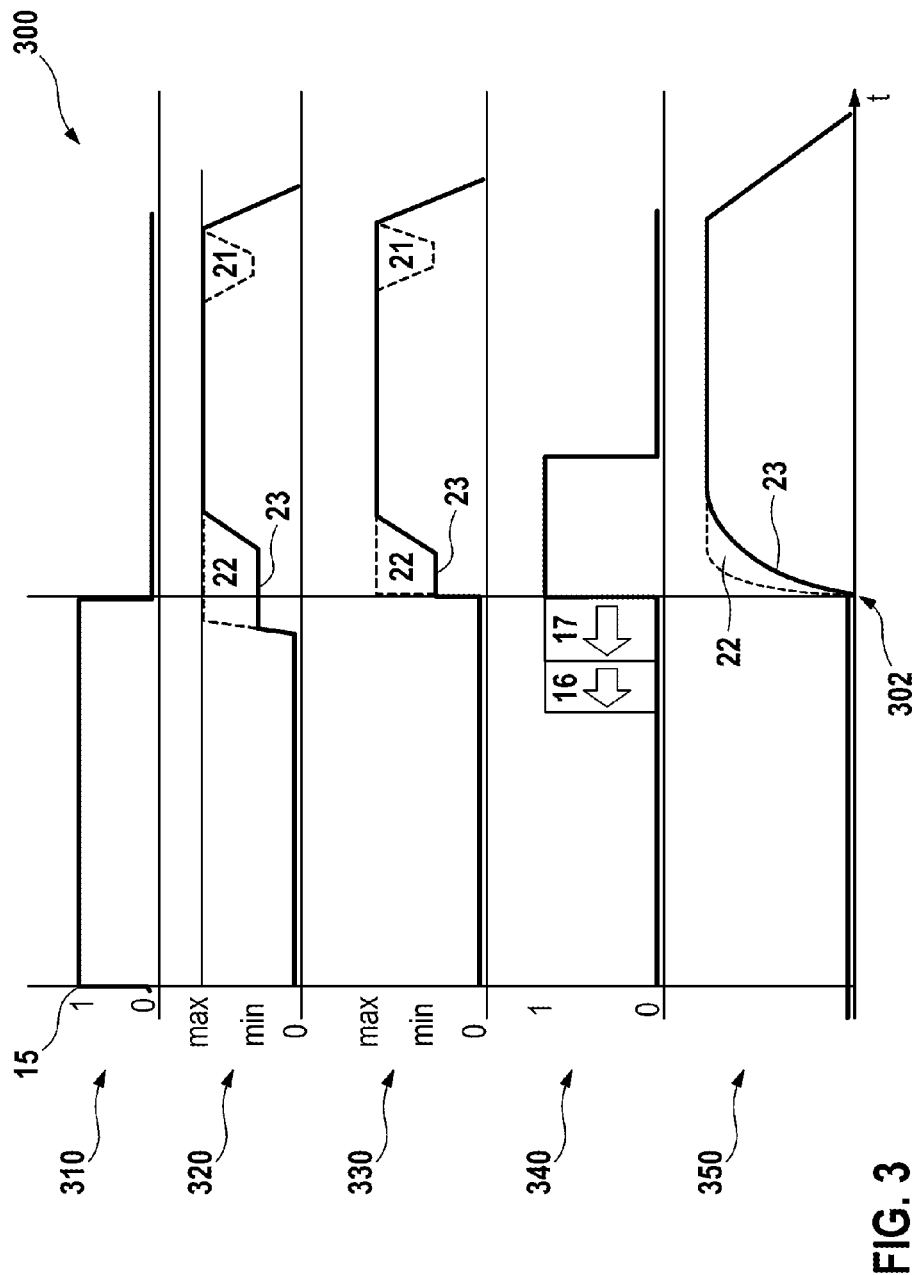
FIG. 3 shows schematically time profiles of parameters and variables of the kind that can occur in advantageous embodiments of a method according to the invention.

FIG. 3 illustrates schematically time profiles of parameters and variables of the kind that can occur in advantageous embodiments of a method according to the invention in the form of diagrams, said profiles being denoted collectively by 300. The common time axis is denoted by t.

In this case, one or more sensor signals 15 are shown in a first partial diagram 310. In particular, these may be signals from locking sensors, door opening sensors, seat occupancy detection (in particular of a driver's seat), belt buckle sensors and/or the like. These signals 15 indicate that a cold start of the engine is probable.

In the diagrams 300, an actual time of a start request (e.g., ignition lock signal) is denoted by 302. It can be clearly seen that the sensor signals 15 already indicate the imminence thereof some time before the start request time 302 by means of a value "1".

It is therefore possible, even before a start request of a user (e.g., actuation of a start switch, turning of an ignition key), to take measures which prepare the exhaust gas burner for its actual start of operation. For this purpose, the spark plug 12 is already activated, this being represented in an ignition curve 340. Depending on the outside temperature, time of year, time of day or similar influencing factors, which can be determined by means of further sensors or in some other way, a short preheating time 17 or a longer preheating time 16 can be set.

Furthermore, in order to prepare the exhaust gas burner 3 for its use for heating the catalytic converter 4, the secondary air pump 13 can already be activated, this being illustrated in a partial diagram 320, which depicts a delivered air quantity over the time axis t.

At the time of the start request 302, the injection valve is also triggered, as can be seen from a partial diagram 330, which illustrates the injected fuel quantity 11 against time t.

The heating of the combustion chamber of the exhaust gas burner 3 resulting from the burner operation started in this way (and thus also the heating of the downstream catalytic converter 4 with a small time delay) can be read from a temperature curve 350.

In the curves 300, two different operating variants 22 and 23 are illustrated, differing in the starting phase of normal operation of the exhaust gas burner 3 (directly after the start request time 302 or later).

In a first operating variant 23, a reduced air quantity (320) and fuel quantity (330) are first fed into the exhaust gas burner in order to ensure reliable ignition with reduced burner power. The quantities are then rapidly increased to a maximum value, at which the exhaust gas burner 3 delivers its rated power.

In a second operating variant 22, the quantity of air and fuel required for the rated power is supplied to the exhaust gas burner 3 directly at the starting time 302, resulting in a faster temperature build-up (350). This is made possible by the preheating of the combustion chamber of the exhaust gas burner 3 since the elevated temperature makes it possible to ensure reliable starting of the burner even at full load.

As already mentioned, provision can be made to throttle the burner power if the exhaust gas back pressure becomes too high with the internal combustion engine already started. This is indicated in partial diagrams 320 and 330 by a reduced air or fuel quantity 21.

It is self-evident that, if appropriate, the exhaust gas burner 3 can be started (that is to say supplied with fuel) even before the actual start signal (e.g., ignition lock), particularly if starting of the internal combustion engine 1 is very probable. In this context, it is also possible, for example, to take into account a usage history, which can be evaluated by means of pattern recognition or machine learning mechanisms in order to assess the probability of an imminent start of the internal combustion engine 1.

The invention claimed is:

1. A method for operating an exhaust gas burner (3) downstream of an internal combustion engine (1) and upstream of an exhaust gas catalytic converter (4), the method comprising:
   controlling an ignition device (12) of the exhaust gas burner (3) to preheat a combustion chamber of the exhaust gas burner (3) during a predeterminable preheating phase without supplying fuel (11) to the exhaust gas burner (3) during the preheating phase, and after completion of the preheating phase, supplying fuel (11) to the exhaust gas burner (3) and burning the supplied fuel (11) in the exhaust gas burner (3).

2. The method according to claim 1, further comprising determining a start and/or a duration (16, 17) of the preheating phase as a function of input signals (15), which comprise one or more of the group consisting of a temperature, a locking state of a vehicle door, a seat occupancy state, a belt buckle state and a start request.

3. The method according to claim 1, wherein the duration (16, 17) of the preheating phase is selected from a range between 0.2 s and 10 s.

4. The method according to claim 1, wherein the ignition device (12) generates a spark with a length in a range between 0.5 mm and 2.5 mm.

5. The method according to claim 1, wherein a power of the exhaust gas burner (3) is increased to a rated power of the exhaust gas burner (3) within less than 5 s after the start of the supply of fuel (11).

6. The method according to claim 1, further comprising controlling the power of the exhaust gas burner (3) as a function of a pressure downstream of the internal combustion engine (1).

7. The method according to claim 1, wherein a spark plug is used as the ignition device (12).

8. The method according to claim 1, further comprising activating (320) a secondary air pump (13) during the preheating phase in order to supply fresh air to the exhaust gas burner (3).

9. A processor unit which is configured to operate an exhaust gas burner (3) downstream of an internal combustion engine (1) and upstream of an exhaust gas catalytic converter (4), by:
   controlling an ignition device (12) of the exhaust gas burner (3) to preheat a combustion chamber of the exhaust gas burner (3) during a predeterminable preheating phase without supplying fuel (11) to the exhaust gas burner (3) during the preheating phase, and after completion of the preheating phase, supplying fuel (11) to the exhaust gas burner (3) and burning the supplied fuel (11) in the exhaust gas burner (3).

10. A non-transitory, computer-readable storage medium containing instructions that when executed by a computer cause the computer to operate an exhaust gas burner (3) downstream of an internal combustion engine (1) and upstream of an exhaust gas catalytic converter (4), by:
   controlling an ignition device (12) of the exhaust gas burner (3) to preheat a combustion chamber of the exhaust gas burner (3) during a predeterminable preheating phase without supplying fuel (11) to the exhaust gas burner (3) during the preheating phase, and after completion of the preheating phase, supplying fuel (11) to the exhaust gas burner (3) and burning the supplied fuel (11) in the exhaust gas burner (3).

* * * * *